(12) United States Patent
Rigollet et al.

(10) Patent No.: US 7,802,821 B2
(45) Date of Patent: Sep. 28, 2010

(54) CLAMPING DEVICE WITH A CLAMPING COLLAR AND A POSITIONING PIECE

(75) Inventors: Nicolas Rigollet, Romorantin (FR); Fabrice Prevot, Selles-sur-Cher (FR); Eric Mesnard, Tours En Sologne (FR)

(73) Assignee: Etablissements Caillau, Moulineaux (FR)

( * ) Notice: Subject to any disclaimer, the term of this patent is extended or adjusted under 35 U.S.C. 154(b) by 0 days.

(21) Appl. No.: 12/174,482

(22) Filed: Jul. 16, 2008

(65) Prior Publication Data

US 2009/0019673 A1 Jan. 22, 2009

(30) Foreign Application Priority Data

Jul. 16, 2007 (FR) .................................. 07 56510

(51) Int. Cl.
*F16L 55/00* (2006.01)
(52) U.S. Cl. .......................... 285/23; 285/420; 285/252
(58) Field of Classification Search .................. 285/23, 285/420, 252; 24/20 TT, 20 LS, 20 R
See application file for complete search history.

(56) References Cited

U.S. PATENT DOCUMENTS

| | | | | |
|---|---|---|---|---|
| 1,389,282 A | * | 8/1921 | Yingling | 285/417 |
| 3,365,218 A | * | 1/1968 | Denyes | 285/253 |
| 3,389,442 A | * | 6/1968 | Tetzlaff | 24/278 |
| 3,407,448 A | * | 10/1968 | Tetzlaff et al. | 24/19 |
| 3,477,106 A | * | 11/1969 | Tetzlaff et al. | 24/279 |
| 4,453,289 A | * | 6/1984 | Kleykamp et al. | 24/20 TT |
| 5,115,541 A | * | 5/1992 | Stichel | 24/20 R |
| 5,309,607 A | * | 5/1994 | Hohmann et al. | 24/274 R |
| 5,499,430 A | * | 3/1996 | Strazar | 24/279 |
| 5,946,775 A | * | 9/1999 | Calmettes | 24/20 TT |
| 6,088,886 A | * | 7/2000 | Gyongyosi | 24/279 |
| 6,824,169 B2 | * | 11/2004 | Coffman | 285/23 |
| 6,942,253 B2 | * | 9/2005 | Bowater | 285/23 |
| 7,399,005 B2 | * | 7/2008 | Rigollet et al. | 285/407 |

FOREIGN PATENT DOCUMENTS

| | | |
|---|---|---|
| EP | 0571294 | 11/1993 |
| FR | 2680405 | 2/1993 |
| FR | 2756356 | 5/1998 |

* cited by examiner

*Primary Examiner*—David E Bochna
(74) *Attorney, Agent, or Firm*—The Webb Law Firm (57) ABSTRACT

A device includes a clamping collar having a belt that has two substantially cylindrical faces and that is suitable for being tightened around an article to be clamped; and at least one positioning including a securing plate that is disposed facing a first face of the belt while being retained relative to the belt; and a positioning portion that is suitable for positioning the device relative to the article to be clamped. When the collar is in its initial, non-tightened state, the securing plate is braced against the first face of the belt, wherein at the beginning of tightening, the plate deforming causes the bracing effect to cease, thereby allowing the belt and the plate to move relative to each other. The plate is suitable for being deformed while the collar is being tightened onto the article so as to present curvature that matches the curvature of the belt.

21 Claims, 7 Drawing Sheets

CLAMPING DEVICE WITH A CLAMPING COLLAR AND A POSITIONING PIECE

The present invention relates to a clamping device comprising: a clamping collar having a belt that has two substantially cylindrical faces and that is suitable for being tightened around an article to be clamped; and at least one positioning piece comprising: a securing plate that is disposed facing a first face of the belt while being retained relative to said belt; and a positioning portion that is suitable for co-operating with the article to be clamped so as to position the device relative to said article.

BACKGROUND OF THE INVENTION

It is advantageous to position the clamping collar relative to the article to be clamped so as to ensure that the clamping is performed in the desired region. When the clamping serves not only to fasten the article to be clamped to some other article, but also to make that fastening leaktight, the need to have correct positioning is particularly acute.

In addition, it is advantageous to position the collar relative to the article to be clamped before said article is connected to another article to which it is to be fastened.

That makes it possible to pre-position the clamping collar, and, in particular, to deliver the article to be clamped as pre-equipped with the clamping collar.

OBJECTS AND SUMMARY OF THE INVENTION

An object of the invention is to propose a device of the above-mentioned type in which the coupling between the positioning piece and the belt of the collar is secure and inexpensive, while also being achieved in such a manner as not to be detrimental to the clamping.

This object is achieved by the facts that, when the collar is in its initial, non-tightened state, the securing plate is braced against the first face of the belt, that said plate is suitable for being deformed while the collar is being tightened onto the article so as to present curvature that matches the curvature of the belt, and that, at the beginning of tightening, the plate deforming causes the bracing effect to cease, thereby allowing the belt and the plate to move relative to each other.

By means of these features, the securing plate is held merely by a simple bracing effect, without it being necessary for complex fastening. This bracing makes it possible to position the plate relative to the belt of the collar without the plate being floating relative to the belt, so that said plate is placed at the desired location relative to the belt. The plate deforming at the beginning of tightening causes the bracing to cease, thereby allowing the belt and the plate to move relative to each other. Thus, the presence of the plate is in no way detrimental to the diameter of the collar reducing during tightening, or to the quality of the clamping.

Preferably, when the collar is in the initial, non-tightened state, a face of the securing plate that faces towards the first face of the belt has at least two bracing zones in contact with said first face of the belt and a separation zone that is disposed between the two bracing zones and that is spaced apart from said first face of the belt.

This feature makes it possible to achieve the bracing simply and effectively.

Advantageously, the first face of the belt is the inside face of said belt, and, when the collar is in the non-tightened state, the securing plate has at least one chord portion that is disposed substantially on a chord of an arc defined by the portion of the inside face of the belt that is situated facing said chord portion.

The plate thus has a simple shape, and it is easy to position relative to the belt. It should be noted that this does not prevent the plate from having a small amount of curvature, as described below.

Advantageously, the positioning portion of the positioning piece projects axially relative to one edge of the belt.

This makes it possible to achieve co-operation between the positioning piece and the article to be clamped in a region of that article that is remote from the region that is situated under the belt and that is directly affected by the clamping force.

Advantageously, the positioning portion presents at least one axial abutment surface that extends substantially perpendicularly relative to the axis of the belt.

Said axial abutment surface co-operates with a corresponding surface provided on the article to be clamped, in particular the free end of said article, or indeed a shoulder at the surface thereof, so that the positioning makes it possible to wedge the belt of the collar axially relative to the article to be clamped.

It is also advantageous for the positioning portion to present at least one hook.

Said hook can be hooked to the article to be clamped prior to tightening in order to prevent any relative displacement between the clamping device and said article.

In a particularly advantageous embodiment, the positioning portion comprises a sheet portion integral with the securing plate, said sheet portion being substantially parallel to the axis of the belt and having an edge that is remote from said plate and that is provided with at least one retaining lug folded back towards the same side as the side on which the inside face of said sheet portion is situated.

The positioning portion is thus implemented particularly simply and inexpensively. The entire positioning piece can be made from one strip, a portion of which is used to form the securing plate while the other portion is used to form the positioning portion.

Advantageously, the collar is provided with a tightening mechanism comprising a tangential screw disposed in a bearing mounted at a first end of the belt, and the second end of the belt is inserted into the bearing, between the screw and the outside face of said first end, and presents tightening pieces in relief with which the thread of the screw is suitable for co-operating while said screw is turning, so as to move the second end of the belt relative to the first end thereof.

A particularly advantageous use of the invention is when the collar is of the "tangential-screw collar" type.

BRIEF DESCRIPTION OF THE DRAWINGS

The invention can be better understood and its advantages appear more clearly on reading the following description of embodiments given by way of non-limiting example. The description refers to the accompanying drawings in which.

MORE DETAILED DESCRIPTION

Figure 1:
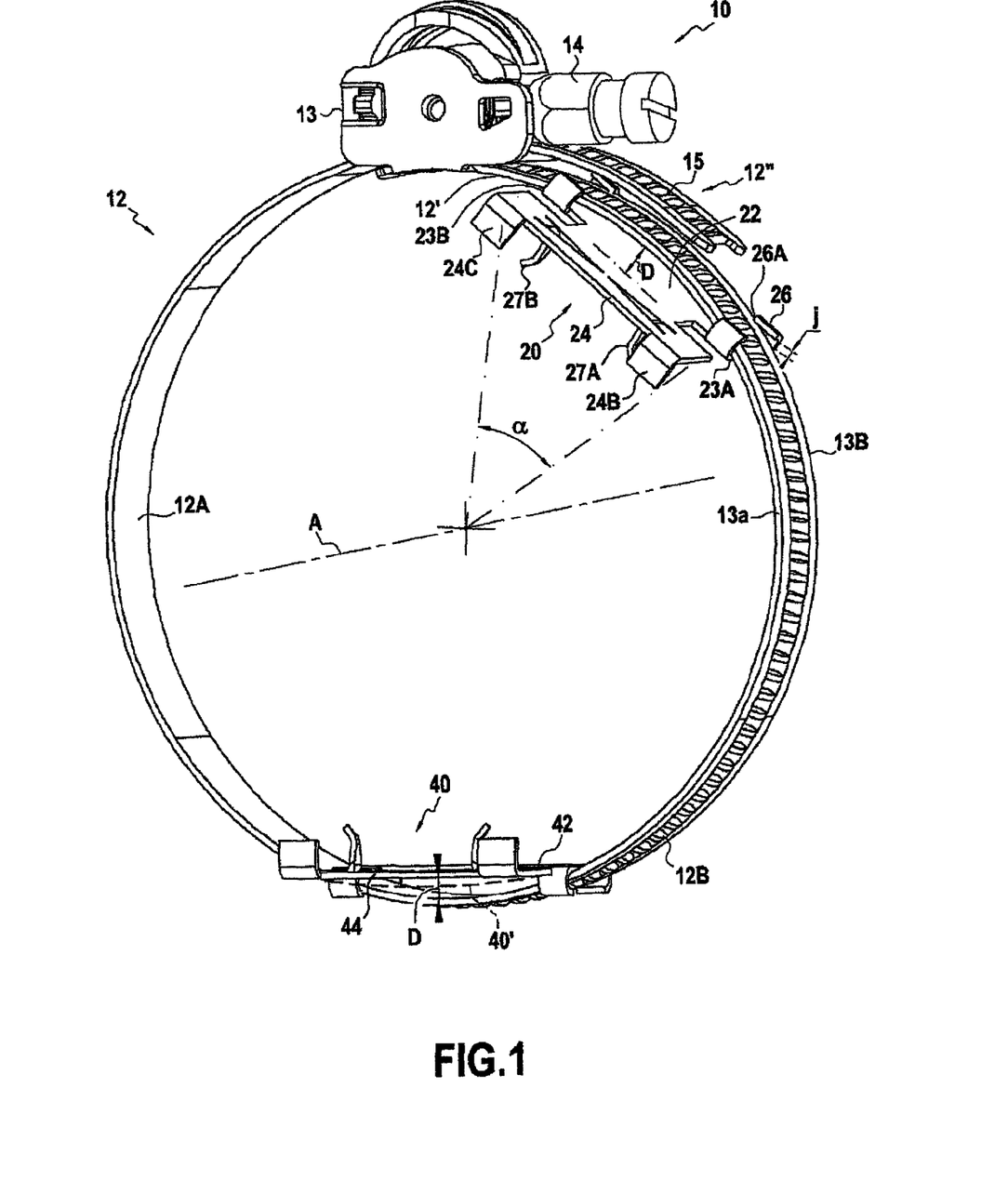
FIG. 1 is a perspective view of a first embodiment of the device of the invention.

FIG. 1 is described first below. It shows a clamping device of the invention comprising a clamping collar 10 and two positioning pieces, respectively 20 and 40. The collar 10 comprises a belt 12 having two substantially cylindrical faces, namely an inside face 12A facing towards the axis A of the collar, and an outside face 12B facing in the opposite direction to the direction in which the inside face 12A faces. In this example, the collar is of the tangential-screw type. It thus has a tightening mechanism comprising a bearing 13 mounted at a first end 12' of the belt. This bearing supports in rotation a screw 14 that extends tangentially relative to the cylindrical surface of the belt 12 of axis A. The outside face 12B of the belt is provided with tightening pieces in relief 15 that are disposed at least in the region of the second end 12" of the belt that is inserted into the bearing, between the screw and the outside face of the first end 12'. Said tightening pieces in relief can co-operate with the thread of the screw while said screw is turning so as to move the second end of the belt relative to the first end. This type of collar is known, for example, from Patents EP 0 571 294 and FR 2 756 356.

Figure 2:
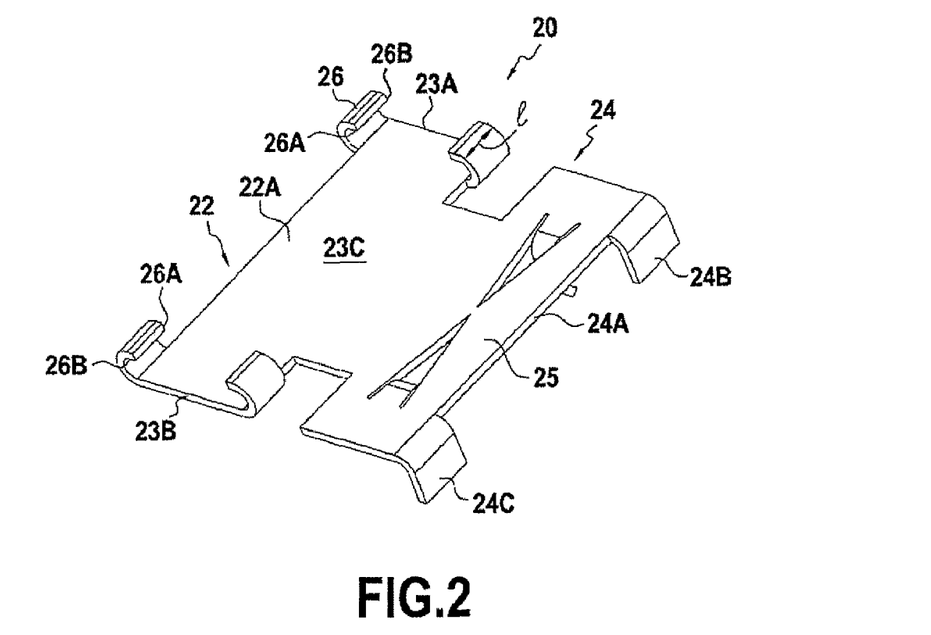
FIGS. 2 and 3 are perspective views of the positioning piece, respectively showing its inside face and its outside face.
Figure 3:
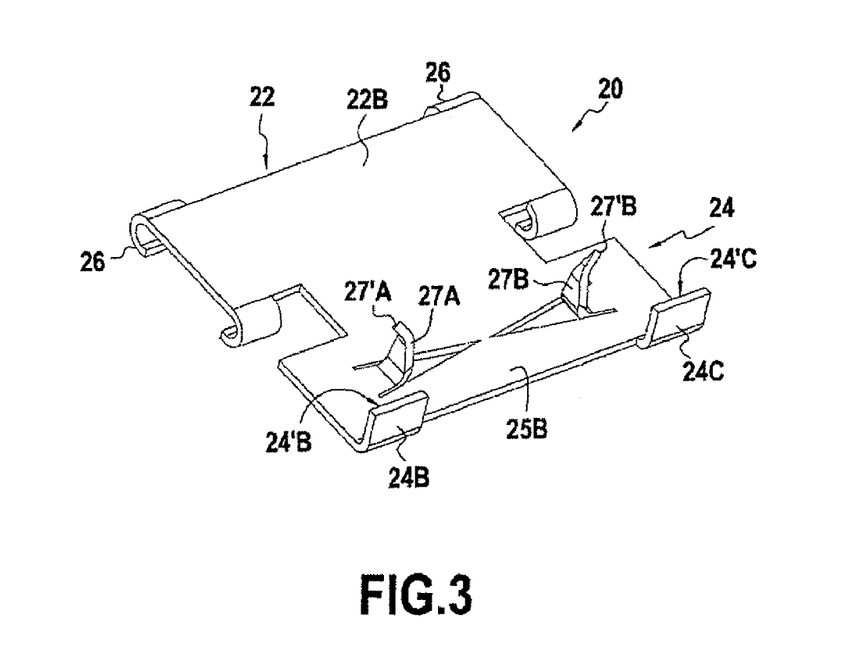

Each of the two positioning pieces 20 and 40 comprises a securing plate, respectively 22 and 42, that is disposed facing the inside face 12A of the collar while being retained relative to the belt, and a positioning portion, respectively 22 and 44. The positioning piece 20 is described below with reference to FIGS. 2 and 3. It can be understood that this piece is formed in one piece by performing cutting-out and folding operations on a strip. The positioning portion 24 comprises a sheet portion 25 that is integral with the securing plate 22. In this example, the plate 22 and the sheet portion 25 are formed in continuity with each other and form a flat plate element.

By also examining FIG. 1, it can be seen that the positioning plate 22 is retained relative to the belt 12 of the collar by retaining members that comprise retaining tabs 26 that are curved back over the edges 13A and 13B of the belt. These edges are the transverse edges of the belt, which edges extend perpendicularly to the axis A. Said tabs are formed on the longitudinal edges of the plate, which edges extend perpendicularly to the axis A. It can be seen that the tabs are curved back over the edges 13A and 13B without being clamped onto those edges, as indicated by the clearance j shown in FIG. 1. The tabs 26 are curved back towards the same side as the side on which the outside face 22A of the plate 22 is situated, opposite from the side on which its inside face 22B is situated (see also FIGS. 2 and 3).

FIG. 1 shows the clamping device in the initial state in which the collar 10 is not tightened, and it can be seen that the securing plate 22 or 42 is braced against the face 12A of the belt. More precisely, the face 22A of the plate that faces towards the face 12A of the belt and that thus faces outwards relative to the axis A, has two bracing zones, formed at respective ones of the ends 23A and 233 of the plate that are in contact with the first face 12A of the belt, while the remainder of the outside face of the plate forms a separation zone 23C that is disposed between the two bracing zones and that is spaced apart from the first face of the belt, as indicated by the doubled-headed arrow D.

In order to facilitate this bracing effect, it is advantageous for the bracing zones to be remote from each other, e.g. by being formed at the longitudinal ends 23A and 23B of the plate 22, which ends extend parallel to the axis A. It is also possible to make provision for the contact between the face 22A of the plate and the face 12A of the belt to be established in two zones that are offset relative to said ends 23A and 23B.

In the contact zones, the face 22A of the plate forms an angle with the face 12A of the belt. The retaining tabs are shaped such that the contact between said tabs and the outside face 12B of the belt is established on those edges 26A of said tabs that are opposite from the ends 23A and 23B and that are thus situated spaced apart from the bracing zones. In this example, the retaining tabs are formed in the immediate vicinity of the ends 23A and 23B because their edges 26B opposite from the above-mentioned edges 26A extend in continuity with said ends 23A and 23B. The length l of the retaining tabs, as measured in the lengthwise direction of the plate, perpendicularly to the axis A, is such that the distance between the edges 26A of the retaining tabs and the bracing zones formed by the ends 23A and 23B of the plate is sufficient. A lever effect is thus generated at each end, facilitating bracing.

The preferably metal strip from which the securing plate 22 is formed has a thickness that is sufficiently small for the plate 22 to deform while the collar is being tightened onto the article to be clamped, so as to adopt, during the tightening, curvature that is close to the curvature of the belt, the thickness of said metal strip being, in this example, substantially equal to the thickness of the strip from which the belt 12 is formed. The securing plate 22 is an elongate piece, its length being measured perpendicularly to the axis A, which piece covers an angular sector α of the face 12A of the belt, which angle α advantageously lies in the range 5° to 20°.

In the embodiment shown, that face of the belt 12 against which the plate 22 is disposed is its inside face 12A. In this situation, as can be seen in the drawing, the securing plate 22 forms a chord portion disposed substantially on a chord of an arc defined by that portion of the face 12A of the belt that is situated facing said chord portion. In this example, the plate is rectilinear, so that said chord portion is genuinely like the chord of an arc. However, in the meaning of the present invention, it is sufficient for the securing plate to have at least one chord portion disposed substantially on such a chord. It is advantageous for the positioning plate to present concavity, as indicated in dashed lines for the plate 40 and as referenced 40'. It can be seen that said concavity faces in the same direction as the concavity of that portion of the inside face of the belt that faces the plate. The general curvature of the chord portion is less than the curvature of the portion of the inside face of the belt. In particular, if the plate is cylindrical in shape, its radius of curvature in the free state is greater than the radius of curvature of the belt, e.g. approximately in the range 2 to 10 times the radius in question.

It should be noted that the concavity of the plate can be non-continuous, it being possible for said plate to have the shape of an angular sector with an obtuse angle at its vertex, preferably greater than 160°, or indeed greater than 170°.

It should be noted that the plate could be disposed on the outside of the belt of the collar. In which case, the plate could also have a concave shape, with the concavity facing in the same direction as the concavity of said belt, but its radius of curvature would then be significantly smaller than the radius of curvature of the belt. The retaining tabs would then be curved back inwards so that their ends come into place under the inside face of the belt. The dimension l of the tabs in the longitudinal direction of the securing plate would then preferably be increased relative to the dimension shown in the figures, so as to enable the bracing cease during the tightening, under the effect of said tabs deforming due to the reaction stresses of the article to be clamped.

In this example, as indicated above, the plate is, however, situated against the inside face of the belt, and the retaining tabs are curved back outwards, i.e. away from the axis A.

The positioning portion 24 of the positioning piece 20 projects axially relative to the edges 13A of the belt 12.

The sheet portion 25 is substantially parallel to the axis A of the belt 12. On its edge 24A remote from the securing plate 22 and also remote form the edge 13A of the belt, the sheet portion 25 presents two retaining lugs 24B and 24C that are folded back towards the same side as the side on which the inside face 25B of the sheet portion is situated. Said lugs are folded back substantially at right angles relative to the sheet portion, so that their inside faces, respectively 24'B and 24'C are substantially perpendicular to the axis A.

Said inside faces form axial abutment surfaces. As can be understood by examining FIGS. 4 and 5, which show the clamping device of the invention as put in place around a pipe 1, said axial abutment surfaces are in axial abutment against the shoulder formed by the free end 1' of the pipe 1. They make it possible to prevent the clamping device from moving relative to the pipe in the direction F indicated in FIG. 5.

In addition, the positioning portion 24 presents two hooks, respectively 27A and 27B that form fastening spikes. In this example, said fastening spikes 27A and 27B project from under the inside face 25B of the sheet portion 25. It can be seen that they are taken from said short portion. More precisely, the fastening spikes are cut out from the sheet portion and folded relative thereto, towards the same side as its inside face.

Figure 4:
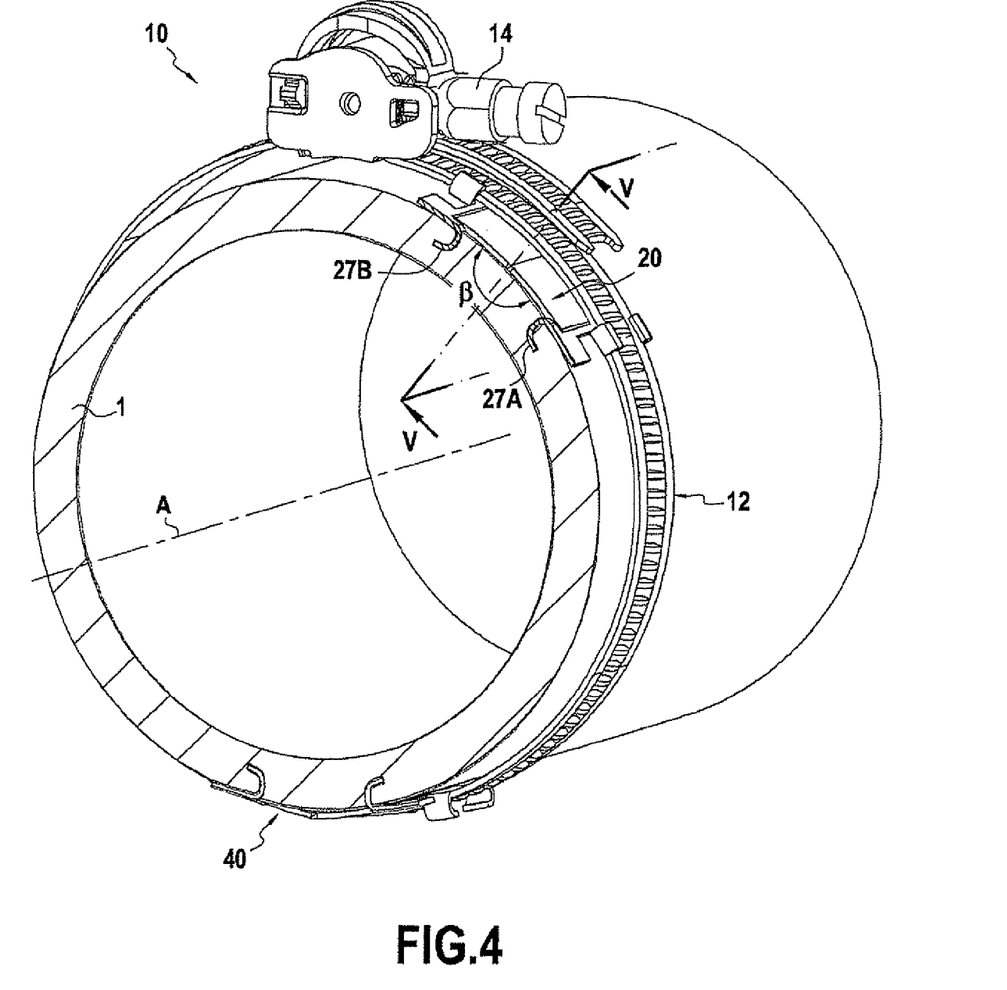
FIG. 4 shows the device of the invention as disposed on an article to be clamped, which article is constituted by a pipe, the device being shown before tightening.
Figure 5:
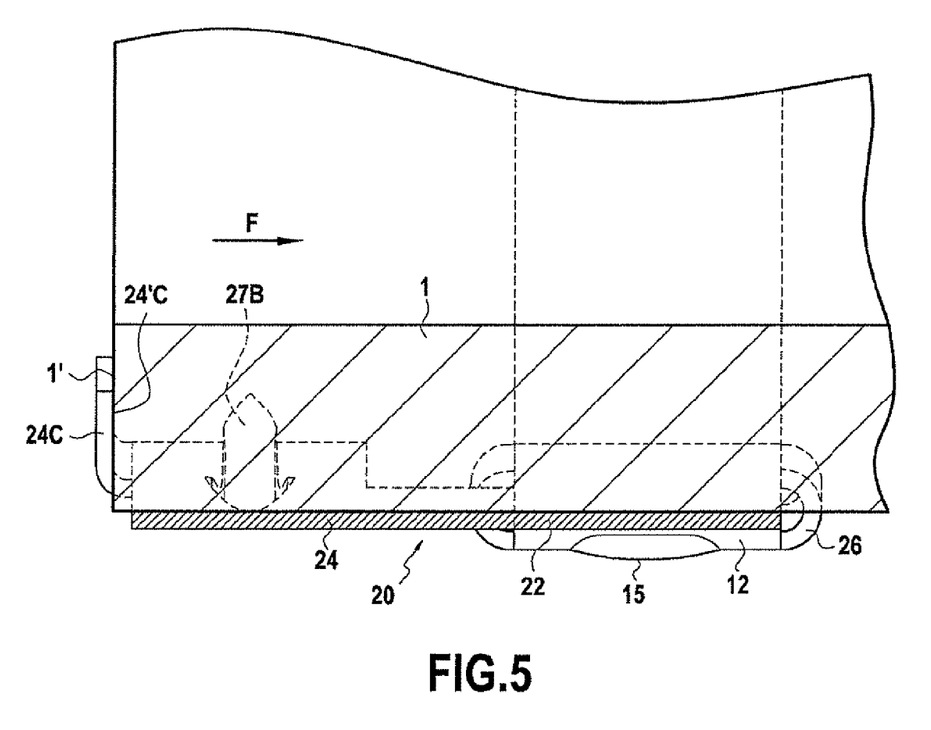
FIG. 5 is a section view on line V-V of FIG. 4.

It can be seen in FIGS. 4 and 5 that the fastening spikes 27A and 27B hook into the pipe 1 in the manner of barbs. In this example, said pipe is made of a material of the elastomer type, into which the fastening spikes, which are harder than that material, can penetrate and fasten. The pointed free ends 27'A and 27'B of the fastening spikes make it easier for them to penetrate into the material of the pipe. It can be seen that they are curved back over towards the inside face 25B of the sheet portion. This makes it possible, on tightening, for each of the fastening spikes, as hooked into the material of the pipe, to take up a shape preventing it from piercing the pipe. While being small enough not to be detrimental to the hooking, the curvature of the free ends 27'A and 27'B makes it possible to pre-direct the deformation of the fastening spikes that takes place during tightening so as to prevent the spikes from moving merely radially in the hooked material.

It can be seen in FIG. 4, which shows a variant of the embodiment of FIG. 1, that the positioning plate and the sheet portion are substantially in the shape of a roof with two slopes, having an obtuse angle β at the vertex that is slightly less than 180°. The vertex is formed by a middle fold parallel to the axis A.

Figure 6:
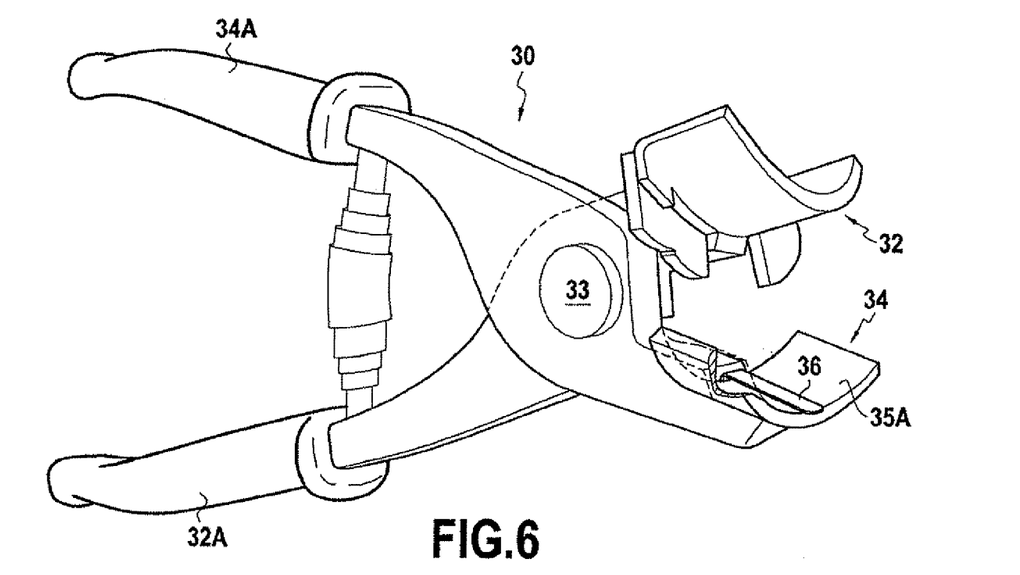
FIG. 6 is a perspective view of a tool for mounting the device on such a pipe.
Figure 7:
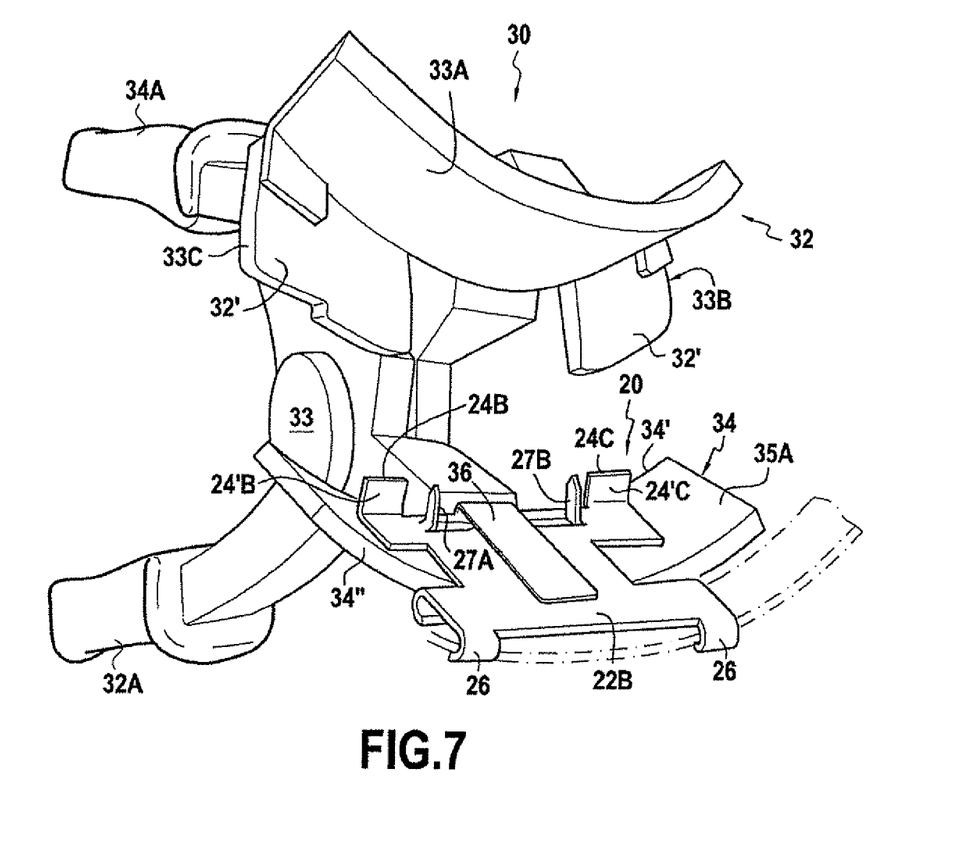
FIG. 7 shows how such a tool co-operates with the device of the invention, prior to mounting said device on a pipe.

FIGS. 6 and 7 show, in one embodiment, a tool making it possible to put the clamping device in place on the pipe 1. In conventional manner, these pliers 30 have two jaws 32 and 34 that can be moved towards each other and away from each other by causing arms 32A and 34A to pivot about a pivot axis 33. The jaw 34 makes it possible to receive the device of the invention prior to tightening. For this purpose, it has an inside surface 35A that presents concavity defining a radius of curvature lying in the vicinity of the radius of curvature of the outside periphery of the pipe. Prior to tightening, the positioning piece 20 is disposed against said inside face 35A, while being retained against it by a resilient blade 36. Since said positioning piece is then mounted on the belt of the collar (shown in dashed lines), the clamping device as a whole is then held by the jaw 34.

In this situation, the retaining lugs 24B and 24C are disposed in the vicinity of the back 34' of the jaw, which back is defined as opposed to its free end 34" which is the end further from the pivot axis 33.

The inside face 33A of the other jaw 32, which face faces the inside face 35A of the jaw 34, is convex and has curvature matching the curvature of the inside face 35A. The back of said jaw 32 presents an abutment surface 321 formed, in this example, of two transverse fins 33B and 33C on the outside faces, remote from the axis 33. In this situation, the end of the pipe A can be placed against the inside face of the jaw 34 and, more precisely, on the blade 36, against the inside face of the positioning piece. The pipe is wedged axially by the above-mentioned abutment surface 32' when the jaws are brought towards each other. In reality, the free end 1' of the pipe 1 comes into abutment against the inside faces 24'B and 24'C of the retaining lugs 24B and 24C. it can be understood that, during the clamping exerted by the pliers, and caused by bringing the two jaws towards each other, the fastening spikes 27A and 27B penetrate into the material of the pipe. After this clamping, the blade 36, which is initially wedged between the material of the pipe and the inside face of the positioning piece, can be removed by exerting axial traction on the pliers.

At the end of this operation, the assembly made up of the pipe and of the clamping device of the invention is obtained, as shown in FIG. 4. This assembly can be handled as a whole, and be coupled to an endpiece onto which the pipe is fitted before the collar is tightened, which tightening can be effected merely by using a tool for driving the screw 14 of the collar, without it being necessary to hold said collar at the same time.

The positioning piece 40 is not described in detail above because it is analogous in all respects to the positioning piece 20. In the example shown, the retaining tabs of both pieces can slide on the belt 12 of the collar. However, it is possible to make provision for the retaining tabs situated at one of the ends of at least one of the two positioning pieces to be crimped or nipped onto the edges of the belt so as to be fixed relative thereto.

In which case, insofar as the positioning tabs of the other end are not clamped onto the belt, the belt and the positioning piece are allowed to move relative to each other while the diameter of the belt is being reduced by the collar being tightened. By fastening one of the ends of the positioning piece to the belt, it is possible to avoid any unwanted displacement of the positioning piece relative to the belt, in particular when, at the beginning of tightening, the bracing effect ceases due to the plate deforming. Preventing such displacement makes it possible, in particular, to keep the collar in the desired angular position relative to the article to be clamped.

In general, provision can be made for one of the ends of the plate to be fixed relative to the belt (by any suitable means, such as welding or clinching, while the other end is free to move while being retained in order to make the initial bracing effect possible.

Figure 8:
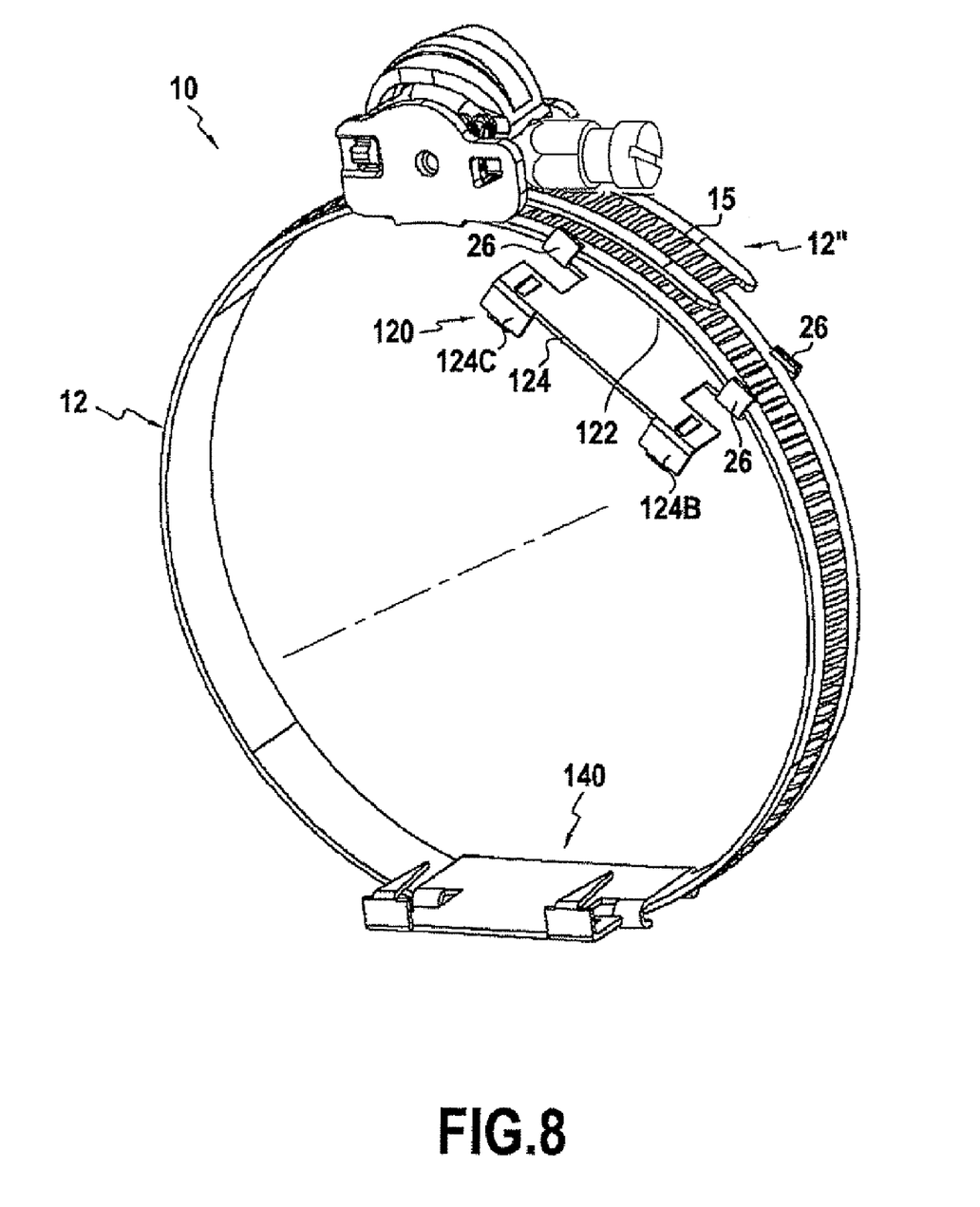
FIG. 8 is a view analogous to FIG. 1, for a second embodiment.
Figure 9:
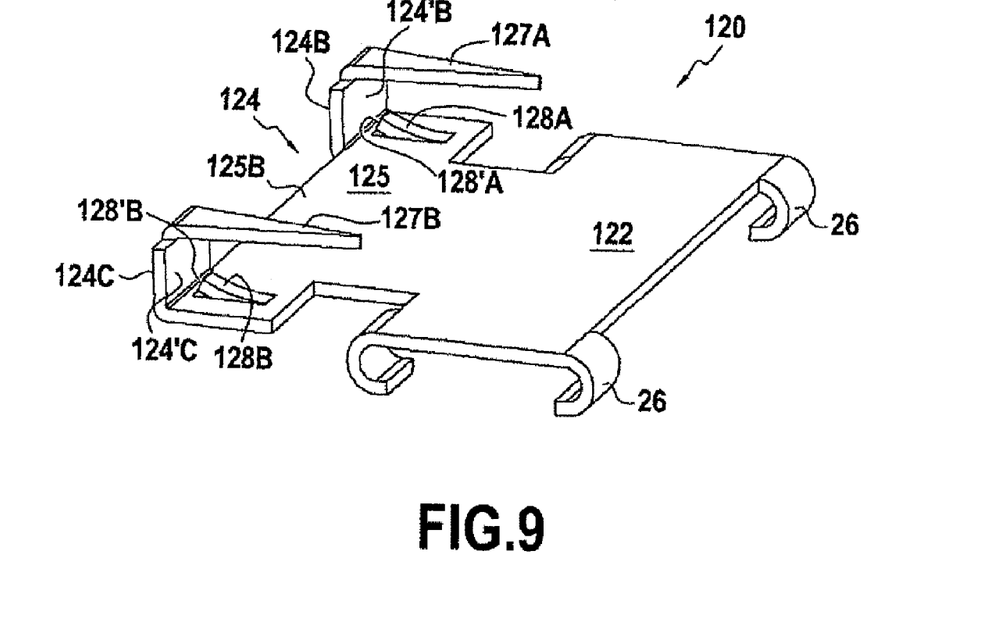
FIG. 9 is a perspective view of the positioning piece used in this second embodiment, showing its inside face.
Figure 10:
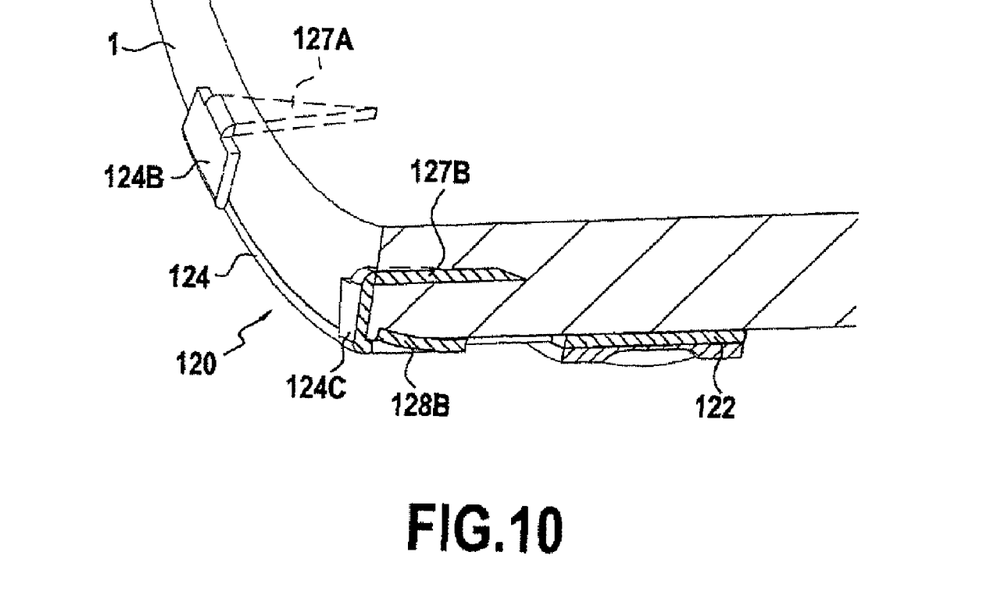
FIG. 10 is a fragmentary perspective view showing, in radial section, how said positioning piece co-operates with a pipe.

The second embodiment is described below with reference to FIGS. 8 to 10. The collar 10 is identical to the collar shown in the preceding figures. The positioning pieces 120 and 140 are analogous to each other and are slightly different from the pieces that are described above. With reference to the positioning piece 120, it can be seen that the differences between said positioning piece 120 and the embodiment shown in the preceding figures lie in the positioning portion 124, while the securing plate 122 remains unchanged. It can be observed, in particular, that it has the same retaining tabs 26 as the securing plate 22 shown in the preceding figures.

As in the first embodiment, the positioning portion 124 comprises a sheet portion 125 that is integral with the securing plate 122. These two elements are formed in continuity with each other, and the positioning piece is formed in one piece from a strip, by folding and cutting out. As in the preceding embodiment, the positioning portion 124 is provided with retaining lugs, respectively 124B and 124C, which are folded back towards the same side as the side on which the inside face 125B of the sheet portion is situated so that their respective inside faces 124'B and 124'C form axial abutment surfaces.

The positioning portion is also provided with fastening spikes, respectively 127A and 127B. However, unlike in the first embodiment, said fastening spikes are formed on the free edges of the retaining edges, which edges are folded back under the sheet portion 125. In general, in the second embodiment, the sheet portion has at least one retaining lug that has an edge forming a fastening spike. Thus, the fastening spikes extend parallel to the axis A, i.e. parallel to the sheet portion.

The second embodiment of the device of the invention can be put in place on the end 1' of a pipe 1 by being moved axially relative to the pipe, so that the fastening spikes 127A and 127B penetrate axially into the material of the pipe and hook, barb-like, into said material.

It can be noted that the sheet portion 125 has two blades 128A and 128B that project from under its inside face 125B. It is advantageous for at least one blade of this type to be present. In this example, said blades are taken from the sheet portion since they are cut out from that portion and lifted away thereunder. They are lifted away such that their respective free edges 128'A and 128'B are directed towards the above-mentioned axial abutment surfaces 124'B and 124'C. Said blades make it possible to keep the material of the pipe spaced apart at a small distance from the inside face of the sheet portion, so as to ensure that the fastening spikes 127A and 127B penetrate properly into the free edges of said pipe. Due to the direction in which their free ends extend, the blades prevent any displacement of the positioning piece relative to the pipe in the direction opposite from the direction F shown in FIG. 5. Said blades can be elastically deformable, so as to operate like springs, by retracting into the thickness of the sheet portion during tightening.

What is claimed is:

1. A clamping device comprising: a clamping collar having a belt that has two substantially cylindrical faces and that is suitable for being tightened around an article to be clamped; and at least one positioning piece comprising: a securing plate that is disposed facing a first face of the belt while being retained relative to said belt; and a positioning portion that is suitable for co-operating with the article to be clamped so as to position the device relative to said article; wherein, when the collar is in its initial, non-tightened state, the securing plate is braced against the first face of the belt, wherein said plate is suitable for being deformed while the collar is being tightened onto the article so as to present curvature that matches the curvature of the belt, and wherein, at the beginning of tightening, the plate deforming causes the bracing effect to cease, thereby allowing the belt and the plate to move relative to each other.

2. The clamping device according to claim 1, wherein, when the collar is in the initial, non-tightened state, a face of the securing plate that faces towards the first face of the belt has at least two bracing zones in contact with said first face of the belt and a separation zone that is disposed between the two bracing zones and that is some distance away from said first face of the belt.

3. The clamping device according to claim 1, wherein the first face of the belt is the inside face of said belt, and wherein, when the collar is in the non-tightened state, the securing plate has at least one chord portion that is disposed substantially on a chord of an arc defined by the portion of the inside face of the belt that is situated facing said chord portion.

4. The clamping device according to claim 1, wherein the first face of the belt is the inside face thereof, and wherein the securing plate presents concavity facing in the same direction as the direction in which the concavity of said portion of the inside face of the belt faces, the general curvature of the securing plate being less than the curvature of said portion of the inside face of the belt.

5. The clamping device according to claim 1, wherein the positioning plate is retained relative to the belt of the collar by retaining members that comprise retaining tabs curved back over the edges of the belt without being clamped onto said edges, so as to enable the tabs to move relative to the belt.

6. The clamping device according to claim 5, wherein, in the non-tightened state, the retaining tabs contact a second face of the belt, opposite from said front face, via contact edges of said tabs so that a clearance is arranged between said second face and edges of said tabs that are opposite from said contact edges, and wherein the securing plate contacts said first face of the belt, via bracing zones that are situated spaced apart from the contact edges in the circumferential direction of the belt.

7. The clamping device according to claim 1, wherein the positioning portion of the positioning piece projects axially relative to one edge of the belt.

8. The clamping device according to claim 7, wherein the positioning portion presents at least one axial abutment surface that extends substantially perpendicularly relative to the axis of the belt.

9. The clamping device according to claim 1, wherein the positioning portion presents at least one hook.

10. The clamping device according to claim 1, wherein the positioning portion comprises a sheet portion integral with the securing plate, said sheet portion being substantially parallel to the axis of the belt and having an edge that is remote from said plate and that is provided with at least one retaining lug folded back towards the same side as the side on which the inside face of said sheet portion is situated.

11. The clamping device according to claim 10, wherein said at least one retaining lug has an edge forming a fastening spike, this free end being folded back under said sheet portion.

12. The clamping device according to claim 10, wherein the sheet portion presents at least one blade projecting under its inside face.

13. The clamping device according to claim 12, wherein said blade is cut out from the sheet portion and lifted away thereunder.

14. The clamping device according to claim 10, wherein the positioning portion has at least one fastening spike projecting under the inside face of the sheet portion.

15. The clamping device according to claim 14, wherein said fastening spike is cut out from the sheet portion and folded back relative thereto.

16. The clamping device according to claim 1, wherein the securing plate is locked in the vicinity of one of its ends relative to the belt.

17. The clamping device according to claim 1, further comprising an additional positioning piece.

18. The clamping device according to claim 1, wherein the collar is provided with a tightening mechanism comprising a tangential screw disposed in a bearing mounted at a first end of the belt, and wherein the second end of the belt is inserted into the bearing, between the screw and the outside face of said first end, and presents tightening pieces in relief with which the thread of the screw is suitable for co-operating while said screw is turning, so as to move the second end of the belt relative to the first end thereof.

19. An assembly comprising the clamping device according to claim 1, and a pipe forming the article to be clamped by means of said clamping device, which clamping device is mounted on one end of the pipe.

20. The assembly according to claim 19, wherein the positioning portion of the clamping device comprises a sheet portion integral with the securing plate, said sheet portion being substantially parallel to the axis of the belt and having an edge that is remote from said plate and that is provided with at least one retaining lug folded back towards the same side as the side on which the inside face of said sheet portion is situated, and, in which the pipe is made of a material of the elastomer type, wherein the fastening spike is hooked barb-like into the pipe.

21. The assembly according to claim 19, wherein the positioning plate is retained relative to the belt of the collar by retaining members that comprise retaining tabs curved back over the edges of the belt without being clamped onto said edges, so as to enable the tabs to move relative to the belt; and
wherein, in the non-tightened state, the retaining tabs contact a second face of the belt, opposite from said front face, via contact edges of said tabs so that a clearance is arranged between said second face and edges of said tabs that are opposite from said contact edges, and wherein the securing plate contacts said first face of the belt, via bracing zones that are situated spaced apart from the contact edges in the circumferential direction of the belt.

* * * * *